G. R. DE MONTLORD.
FLAX TREATING APPARATUS.
APPLICATION FILED MAY 29, 1905.

945,726.

Patented Jan. 4, 1910.
6 SHEETS—SHEET 1.

Witnesses:
G. C. Fuss
R. W. Pittman

Inventor:
Georges R. de Montlord
By his attorney,
F. H. Richards

G. R. DE MONTLORD.
FLAX TREATING APPARATUS.
APPLICATION FILED MAY 29, 1905.

945,726.

Patented Jan. 4, 1910.
6 SHEETS—SHEET 3.

UNITED STATES PATENT OFFICE.

GEORGES R. DE MONTLORD, OF NEW YORK, N. Y., ASSIGNOR TO THE INTERNATIONAL FLAX FIBRE COMPANY, OF NEW YORK, N. Y., A CORPORATION OF DELAWARE.

FLAX-TREATING APPARATUS.

945,726.          Specification of Letters Patent.     Patented Jan. 4, 1910.

Application filed May 29, 1905. Serial No. 262,750.

*To all whom it may concern:*

Be it known that I, GEORGES R. DE MONT-LORD, a citizen of the United States, residing in New York city, in the county of New York and State of New York, have invented certain new and useful Improvements in Flax-Treating Apparatus, of which the following is a specification.

This invention relates to apparatus for treating fibrous plants, and has for an object to provide an improved machine of this character for decorticating, deseeding and deshiving flax and other fibrous plants, which, while crushing and breaking the plant stalks and removing the bark and woody portions from the fibers, will also without injuring them, remove the seed from the plants.

In carrying out my invention a series of pairs of meshing fluted rollers are disposed for successively treating the plant stalks and receiving the same one from the other in rhythmic synchronism of take-up and let-off. This relative meshing of the adjacent pairs being so timed that the entire series will be "attuned" for passing the fibers under uniform tension from pair to pair throughout the series, for establishing a "draw bend" under constant tension in the stalks or fibers at one pair of rolls at a different point from that established in such stalks or fibers at the succeeding or preceding pair of rolls, and that while the fibers or stalks are, as a whole, being passed through the machine at a uniform rate of speed retardation and acceleration will take place at the various working zones in the machine resulting in relative reciprocations in the stalks or fibers. This will produce a drawing of the fibers back and forth over each tooth where they have been bent, the fibers being flexible and the portions of matter which it is desired to remove being less flexible, they after having been broken up will not withstand the reciprocation under tension through the "draw bend."

This invention may be carried out in a machine comprising four pairs of rolls, this being regarded as the minimum number of rolls for efficient commercial use. The rolls will be driven in unison, but the meshing of each pair of rolls will be different in timing or set to the meshing of adjacent pairs. When a strip of material, as for instance a fiber plant, is passing between a pair of fluted rolls which are rotated with a constant angular movement the taking in upon one side and the paying off upon the other side will not be constant, but will vary in an even and rhythmic manner. It may be stated that the action of the rolls or of the respective sides of each pair of intermeshing rolls is rhythmic. The action which may be termed a rhythmic action on both sides of one pair of rolls must be timed to the rhythmic action of the adjacent sides of the pairs of rolls with which it immediately coöperates. The second pair of rolls at its receiving side will have its rhythmic action in attunement with the rhythmic action of the first pair of rolls at its delivery side, and the rhythmic action of the second pair of rolls at its delivery side will be different from the rhythmic action of the delivery side of the first pair of rolls to such an extent that the paying off from such delivery sides will not vary in tension, consequently the rhythmic action of the receiving side of the third pair of rolls will be different from that of the receiving side of the second pair of rolls; and so on throughout the entire complement of pairs. This will maintain the runs of flax between the various pairs of rolls at a uniformly constant tension.

The intermeshing of the flutings of the rolls will produce bends in the plant stalks being treated, and the uniform constant tension maintained in such runs will produce the "draw bends" under tension above alluded to. The mechanical change in this apparatus over existing mechanisms for treating flax and fibrous materials is comparatively small; but of such a radical nature as to increase the efficiency of the apparatus by increasing the percentage of material removed from the fibers, and decreasing the amount of fibers broken and wasted. In the scutching of the hatcheled flax, a quantity of broken bundles of fibers are drawn off with the shive, and become what is known as tow. This has frequently been charged up against the scutching process, or the apparatus employed in scutching, but if the real reason for the large amount of tow were traced to its source, it would be found that in many instances it arose in the breaking apparatus. This present apparatus will minimize to a great extent the breaking of these strands or bundles of fibers, and will also remove a large quantity of the matter heretofore removed in the scutching process, so that not only is the amount and extent of the scutching reduced, by doing part of the work in the breaking apparatus, but also the fibrous material is presented to the scutching apparatus in a better condition for its conservation while passing through such scutching apparatus. It is thought that the hatcheling step may be eliminated, and its work entirely performed in this present apparatus.

In the drawings accompanying and forming a part of this specification Fig. 19 shows gearing for driving the rolls.

Figure 1:
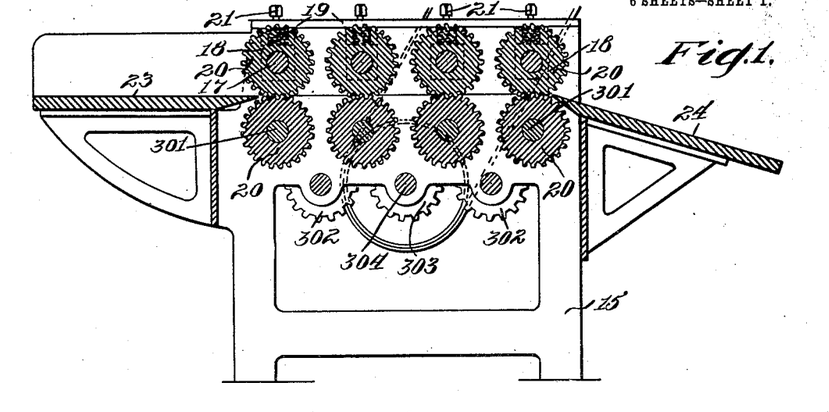
Figure 1 is a vertical longitudinal section of a machine embodying and illustrating a form of my invention.

In Fig. 1 a machine capable of use in carrying out the present improvement is shown in longitudinal section, and such machine comprises a framework 15 of some suitable construction, having a number of sets or pairs of intermeshing fluted rolls 20 mounted therein; the lower of such rolls, in the present instance have journals 301 suitably supported by the framework, and the upper of which rolls have journals 17 supported in bearing blocks or boxes 18, vertically shiftable in ways in the machine frame, and upon which blocks suitable springs 19 are caused to press with the required degree of tension by means of set screws 21. The rolls may all be rotated in unison and with uniform velocity by a suitable train of gearing driven in any convenient manner.

Although this invention is capable of being used with many plants having fibrous stalks or a fibrous sheath surounding the stalk and covered by a cortical or bark portion, yet it is particularly well adapted to the treatment of flax, and in the present description, although flax is mentioned, it will be apparent that other plants may be also treated by the apparatus. The plant will be fed to the machine in an even layer over the feed table 23, and will, after passing through the several pairs of rolls, be discharged over a shelf or chute 24, and the seeds will drop down between the rolls and be permitted to pile up upon the floor, or be caught in some suitable manner.

For the purpose of more conveniently illustrating the present invention I have shown in Fig. 1 a machine having four pairs of rollers, but it will be understood that in practice the number of pairs should be considerably increased and that the aggregate number of pairs will depend somewhat upon the size and physical characteristics of the fiber-plants to be treated. For a medium size flax plant I find it desirable to use in some cases as many as from ten to fifteen pairs of rolls, and in some cases even a larger number. The timing or attuning of the meshing of the flutes or convolutions of the rolls of the several pairs must be such that the flax or other fiber running from one pair to the next pair will be paid off from one pair with the same speed that it is taken up by the succeeding pair. The flutings or teeth of the rolls are such that they mesh after the analogy of gear teeth, the teeth of one roll between those of the opposite roll, and one roll may drive the other; they need not both be positively driven. When both rolls of the pair are not positively driven and a thin layer of flax lies between the rolls one roll will drive the other through this layer. A space will be left between the meeting faces of the teeth or flutes, so that the seeds of the plant will not be crushed while passing between the rolls. The shive and woody portions of the stalks will be broken up and largely removed by the successive bending and drawing action to be hereafter described, and at the same time the seed will be removed.

Figure 2:
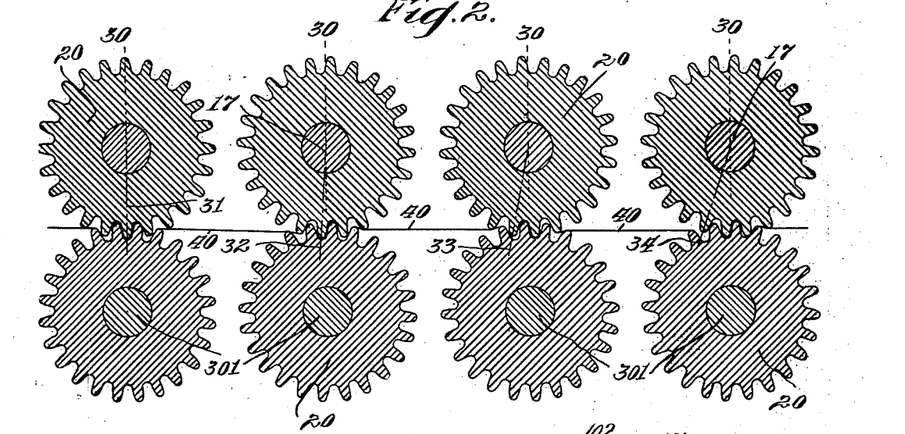
Fig. 2 is an end view of the rolls illustrated in Fig. 1, but showing these rolls enlarged in respect to Fig. 1; but illustrated at about full size for practical use. This view illustrates the relation of timing between several sets or pairs of rolls.

I find in practice that in order to obtain the desired coöperation of the various rolls it is necessary that each successive pair of rolls be set one-third of a pitch distance in phase behind the preceding pair. The take up on the receiving side of one pair will then be in unison with the let off from the adjacent side of the preceding pair of rolls, and the tension upon the runs between the adjacent pairs of rolls will be maintained substantially constant, and the tension on all the runs substantially uniform. In Fig. 2 the rolls illustrated are substantially of the proportions just referred to. The vertical dotted lines 30 are assumed to cut the point or arc of contact of the pitch circles of the several pairs of rolls. In the first pair of rolls, assuming the material being treated to pass from left to right, which is its direction of movement in all the views, the line 31 represents the center of a tooth or fluting of the upper roll in the channel between two flutings of the lower roll and such line coincides with the line 30. It will be seen that the line 32, in such figure, is about one-third of a pitch distance behind the position occupied by the line 31 of the preceding pair, and that the line 33 is about two-thirds of a pitch distance behind the position of the line 31, and line 34 of the last pair, is about, but a little more than, one pitch distance behind the position of the line 31. This construction will permit the flax or other plants being treated to pass through the machine without injury to the fibers, and by reason of the proper and constant tension will remove a large proportion of the woody portion of the stalks which adheres to the fibers. The full efficiency of each pair of rolls is had, the fibers or stalks are gently but positively drawn over the summits of the teeth which are opening apart at the let off side of the rolls and also over those that are closing in at the intake side, the stalks are drawn while bent at each side of each pair of rolls, if proper tension exists. The setting of the rolls is preferably accomplished during the construction of the machine.

Although there are a number of teeth or flutings upon each roll, yet for the present description the teeth which are in or adjacent to the working zone only will receive reference characters and in many of the views such teeth only are shown. In the various views the teeth in such working zone have been indicated by reference characters 101 etc. in the upper rolls of the respective pairs and the teeth of the lower rolls, in such zone, have been designated by the reference characters 21 etc. The convolutions or spaces between such teeth have not been given reference characters to avoid confusing the drawings by a multiplicity of reference characters. The teeth shown in these views are much enlarged.

Figure 10:
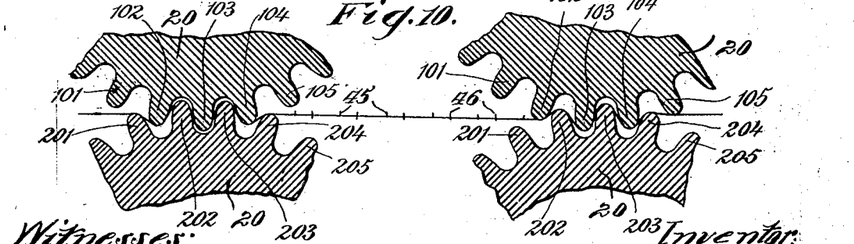
Fig. 10 is a diagrammatical enlarged sectional view of two pairs of rolls, showing the timing whereby the fibers are bent by one pair at different points from the bending by the preceding pair.
Figure 11:
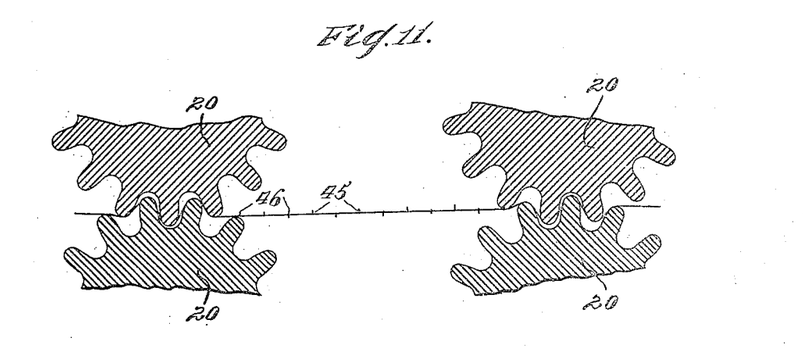
Fig. 11 is a view similar to Fig. 10 but showing rolls of less radius, making a shorter contact distance or working zone.

By means of the present improved machine the draw bend action in each working zone is limited. Reference may here be made to Fig. 10. In the left hand pair of rolls, the tooth 103 may be termed idle in that the fiber passing over its summit will not have at the particular time illustrated any movement relative to such fluting or tooth. This, therefore, we might term the neutral zone. The tooth 103 is neutral in respect to 202 and 203. One working, or draw-bend, zone, will be produced between teeth 201 and 202 and tooth 102 which are closing together. The other working zone will be between teeth 203 and 204 and tooth 104 which are opening and are paying off the fiber strand more rapidly than this is being passed forward by the movement of the tooth 203. In the right hand pair of rolls tooth 203 is the neutral or idle tooth, in that the strand of fiber is moving at the rate of speed of the tooth 204. Teeth 102 and 103 and tooth 202 are receiving the paid off material as rapidly as it is being let out by teeth 203, 204 and 104, and more rapidly than the run of flax is being advanced moving in unison with tooth 203. The flutings may be set far enough apart so that one fluting does not bottom in the groove between flutings of the other roll, which would not only unduly crush the fibers, but also prevent any relative movement between fiber and rolls. The curvature of the rolls and the number of teeth, the distance apart, and the relative height of the teeth, must be such that the working zone will comprise a small number of teeth, and the neutral zone must be restricted in extent. In practice three teeth upon each side of the pair of rolls will be in the active zone, and sometimes one and sometimes two teeth in the neutral zone. As the teeth rotate and the thickness of the run of fibers upon and between them varies the number of teeth in engagement with the fiber will vary from nine to six in the proportion of roll illustrated in Fig. 2 and shown enlarged in the various other views of the drawings.

By having the centers of the rolls properly spaced apart, the bending of the fibers between the intermeshing rolls of one pair will be at a different point to that at which the fiber was bent between the intermeshing rolls of the preceding pair, thus subjecting the fiber to bending at different points along its length, whereby the breaking of the woody portions of the plant stalks will be most efficiently carired on. This is illustrated more clearly in Fig. 10, where the points 45 indicate the positions which have normally been at the centers or summits of the teeth of the upper roll of the pair of rolls at the left-hand side of such view and the points 46 indicate where the summits of the teeth of the upper rolls of the right hand pair will normally engage the fiber when it passes between them. And by carrying out the system of properly distancing the centers of the rolls the summits of the upper rolls will not come in the same position in any two pairs of the series, or the coincidence of bending may be repeated at given intervals if desired. And also by suitably adjusting the centers the summits of the teeth of the lower rolls may be made to engage the flax at the point engaged by the summit of the upper roll of the preceding pair, thus producing a complete reverse bend. In some cases, however, it may be desirable that the alternation of the upward and downward bending be not coincident, in which case the centering of the rolls will be governed accordingly.

The "run" of the fiber from one pair of rolls to the next pair will in its median position coincide with a line connecting the arc or point of contact of the pitch circles of one pair with the arc or point of contact of the pitch circles of the other pair. The teeth when timed to release the fiber and engage the same in unison will cause said run to oscillate upon its center in said line at a point between said points or arcs of contact. If the center of such oscillation remains constant at the center of said line then I assume that the proper relative timing of the rolls exists.

Figure 3:
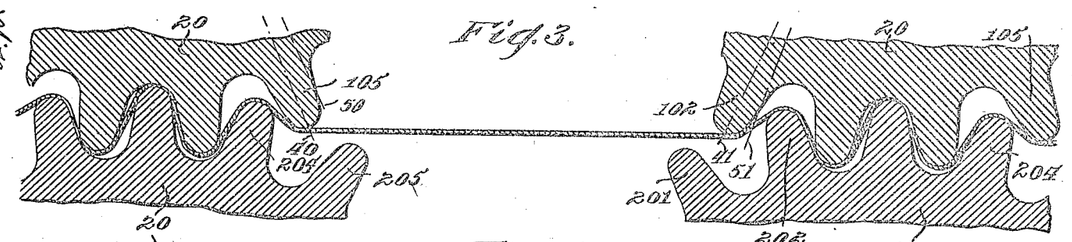
Figs. 3 and 4 are enlarged sectional views, diagrammatical in a sense, showing the action of the teeth of the rolls on the fiber, showing also the operative relation of one pair of rolls with the next succeeding pair or set.
Figure 4:
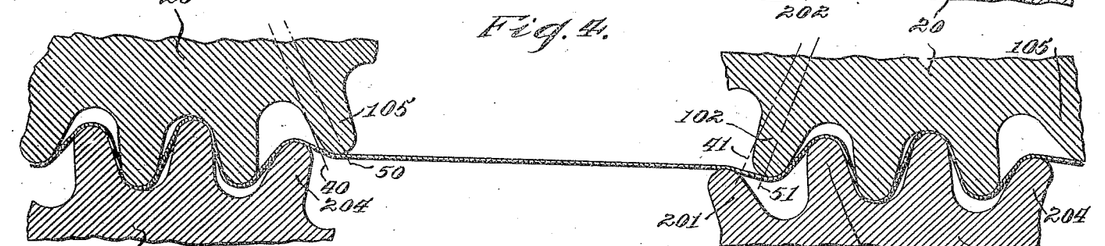
Figure 5:
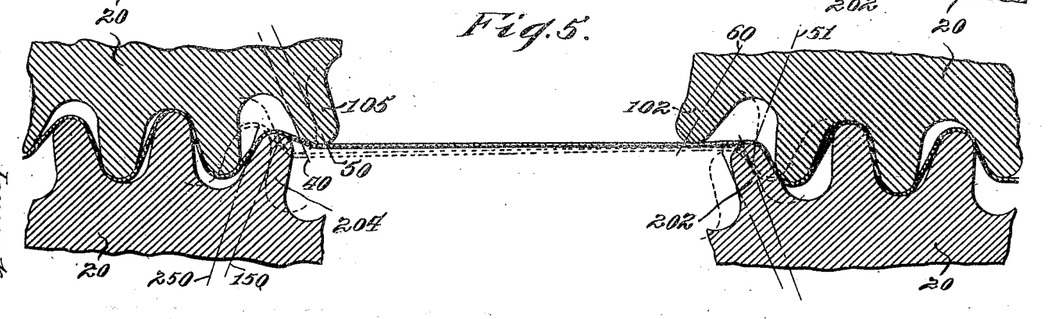
Fig. 5 shows the results of mal-adjustment of a pair of rolls.

The intake on the rearward side of one pair of rolls is made to correspond with the output at the forward side of the next preceding pair of rolls to maintain the intervening run of fiber in a condition of normal stress for producing the draw-bend of the fiber over the edges of the separating flutes of one pair of rolls while correspondingly producing a similar action where the fiber enters between the approaching flutes of the next succeeding pair of rolls, as illustrated in Figs. 3 and 4 wherein the manner in which the flax will be delivered from one pair of rolls and taken up by the next succeeding pair in such a manner that uniform tension will be maintained upon the run, so that the tension will be constant as shown. The tooth 105 is shown in Fig. 3, as emerging or separating from the space between the teeth 204 and 205 in the left hand pair of rolls, and in the right-hand pair the tooth 102 is shown as entering the space between the teeth 201 and 202. The line 40 represents the radius line of the tooth 105, and the line 41 indicates the radius line of the tooth 102, and it will be seen that each of said teeth is bending the fiber over one of the teeth in the lower roll of the pair, namely; the teeth 204 and 202 respectively. The tooth 105 in the upper roll of the left-hand pair is easing up on the flax, whereas the tooth 102 in the right hand roll is depressing the same into the space between the teeth 201 and 202. The amount of release and depression being the same there will be no change in the tension of the run. This can be seen by reference to Fig. 4, wherein the movement of the rolls is indicated by the difference between the radius lines 40 and 50 in the left-hand pair and between the lines 41 and 51 at the right-hand pair. In this case it will be seen that the tooth 105 has nearly released the flax to assume a straight line from the summit of the tooth 204 to the summit of the tooth 201 upon the left-hand side of the right hand pair, and that the tooth 102 in the upper roll of the right-hand pair has commenced to depress the flax between the summit of the teeth 201 and 202. Fig. 5 shows the rolls of the left-hand pair in the same position they occupy in Fig. 4; but the rolls of the right-hand pair are represented in a different angular position than that occupied by these rolls in Fig. 4. In Fig. 5 the radius line 60 drawn through the tooth 105 is farther toward the left than the radius line 51 of the same tooth in the position shown in Fig. 4; line 51 in Fig. 5 showing the position the radius line of such tooth 102 should be in to accomplish the desired result. The dotted lines 150 and 250 in the left-hand pair of rolls indicate the angular position such rolls should be in for coöperation with the angular position represented in the right-hand pair of rolls.

Figure 6:
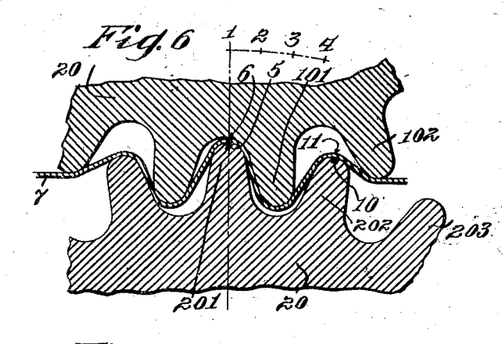
Figs. 6, 7, 8 and 9 are likewise enlarged views of the rolls, but dealing more particularly with each set or pair of rolls themselves, showing the sliding action of the fiber on the teeth as the material passes between them.
Figure 7:
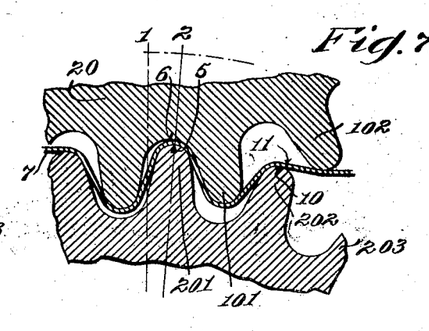
Figure 8:
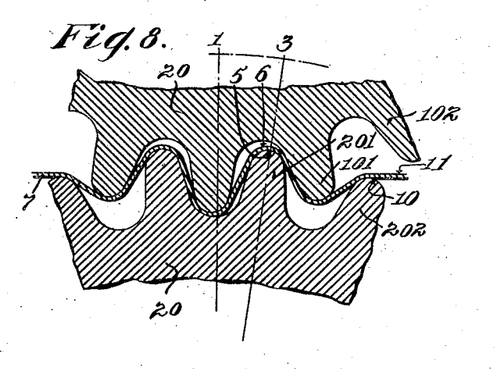
Figure 9:
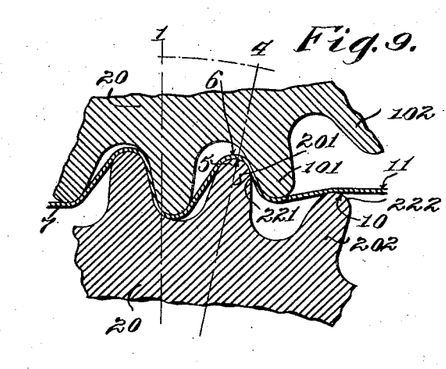

Reference will now be made to Figs. 6, 7, 8 and 9, wherein the point or arc of contact of the pitch lines of the rolls will be indicated by the radius line 1 and a scale advance 2, 3, 4, is indicated at the right of such line. The summit point of the tooth 201 is indicated by 5, which point is in the radius line of such tooth, and in Fig. 6 such summit point coincides with a point 6 arbitrarily indicated upon the flax or fiber 7, which is assumed to be passing between the rolls from left to right as in the other views. After the radius line of the tooth 201 has moved to the point indicated on the scale by 2, it will be seen that the tooth has slipped upon the fiber the distance indicated between the points 5 and 6. The point 10 on tooth 202, which in Fig. 6 was opposite in a radial line to the point 11 upon the flax, has fallen behind such point in Fig. 7, permitting the flax to slip over the tooth of the roll. This latter slipping has been accomplished by the tooth 101 rising out of the space between the teeth 201 and 202. At Fig. 8 where the radius line of the tooth 201 has advanced to point 3, on the scale, it will be seen that the points 5 and 6 are farther apart than in Fig. 7, as are also the points 10 and 11. When the radius line of such tooth 201 has come to the position 4 on the scale, see Fig. 9, it will be seen that the points 5 and 6 are approaching each other, indicating that the flax is then moving faster than the surface 222, of the tooth 202, with which the flax is in contact but that points 11 and 10 are still separating, indicating that the slipping upon the surfaces 221 and 222, of the teeth 201 and 202, is in the same direction, but greater in respect to the latter surface. This slipping is permitted by the tooth 101 coming farther out of the space between the teeth 201 and 202, and also by virtue of the fact that the tooth 102, which in Fig. 6, is shown as depressing the flax between the space between the teeth 202 and 203, has entirely moved away from the flax and no longer bends it into such shape. This slipping above alluded to, not only assists in the crushing of the woody portions of the stalk, but also in the decorticating action, producing a rubbing, and also tends to free the fiber from the woody portion of the stalk by drawing the plant over the summit of the tooth while it is bent, so that, I comprehend, the stalk is given the benefit of three distinct mechanical workings. It is broken by virtue of being bent; it is freed by virtue of being drawn while bent, thus producing a "draw bend" as it were, and during which time there is a rubbing action back and forth of the stalk upon the surface of the tooth over which it is bent. All of which has a tendency to break up and remove all the shive and the stalk portions which are of a woody nature, clearing the same from the fiber. This action may be assumed to be reciprocation as it were, within the working zone of each pair of rolls. The flax as a whole will be moving at a uniform rate of speed, but at each working zone there will be an amount of reciprocation, or relative reciprocation, doubtless a retardation and acceleration of the movement of the flax.

The reciprocation above alluded to not only acts to decorticate and break but also to remove the seeds from the plants, and during which action the tension upon the flax is maintained constant, so that when the reversal of direction, or relative movement, takes place there will be no lost motion, in the nature of back lash, but the bend under tension will be maintained during both movements. The draw-bend action upon the plants not only strips off the shive and woody portions but also strips off the seeds, and in doing this places the seeds in such position relative to the teeth that they will not be crushed by the portions of the teeth which in their intermeshing most nearly approach each other. The slipping of the plants on the teeth, before they actually come into mesh most effectually gets the seeds into positions of safety. The draw-bend action prevents seeds remaining on the summits of the teeth during the passage of the flax between the rolls, the seed being pushed off from such summits find temporary lodgment at places where they will not be crushed by the "bottoming" of the teeth.

It will be remembered that the flax plant is necessarily treated in many instances, for commercial and practical reasons, while the seed remains on the plant, and it is important in such cases to be able to run the plants through the decorticating machine and thus subject them to treatment in such a manner that the seeds will not be, many of them, crushed in the operation. When the seeds are so broken or much crushed their commercial value is not only impaired but the oil flows out and becomes a very objectionable element to the successful and proper operation of the machine upon the fiber. It is, therefore, one of the purposes of my present improvements to provide a machine in which the successive pairs of decorticating rolls shall be so peculiarly related to each other in position, construction and mode of operation as to provide an effective treatment of the fiber portion of the plant while avoiding almost entirely the objectionable result of breaking and crushing the seed, while at the same time separating the seeds from the plant in an effective manner.

Figure 12:
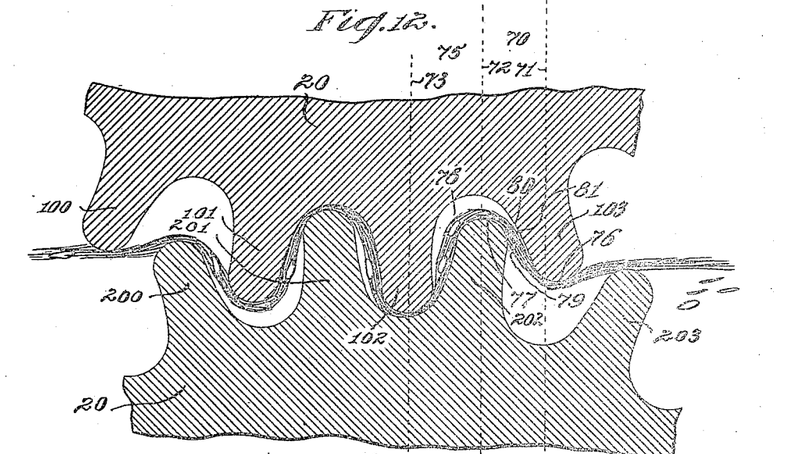
Fig. 12 is a diagrammatical illustration of the theory of the action of the teeth or flutings of the rolls in removing the seed from the plant without injury to either.
Figure 13:
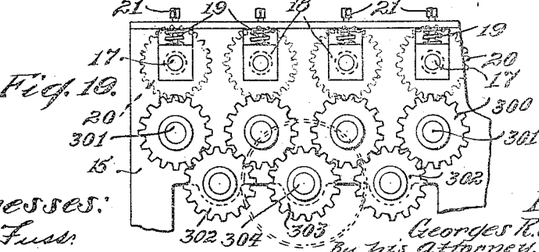
Figs. 13–18 inclusive are diagrammatic representations showing the teeth of two pairs of rolls in six different positions in one pitch distance.
Figure 14:
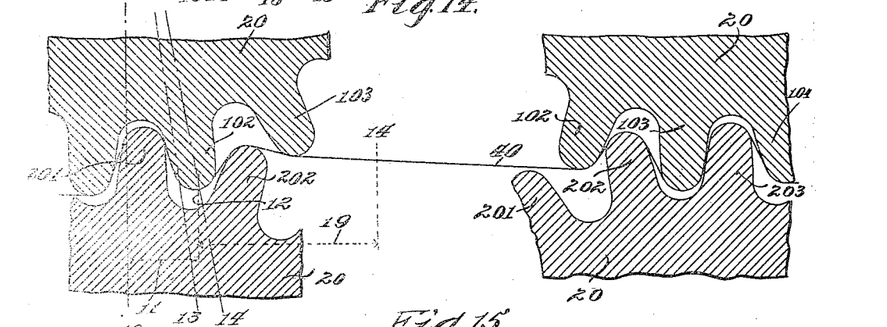
Figure 15:
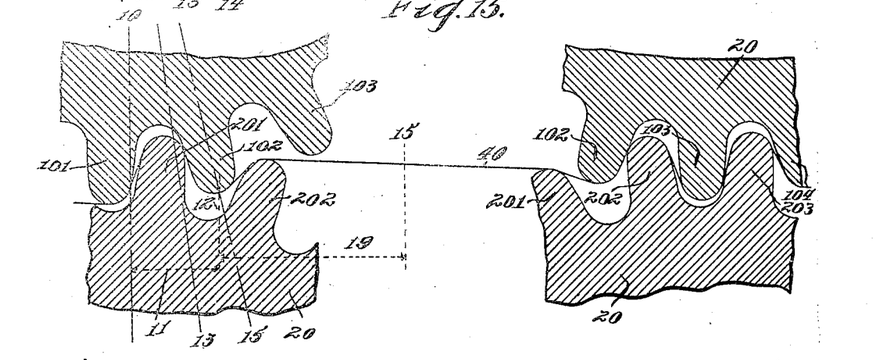
Figure 16:
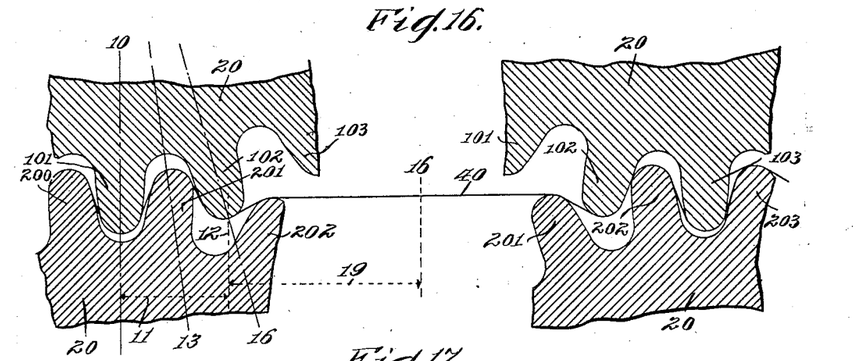
Figure 17:
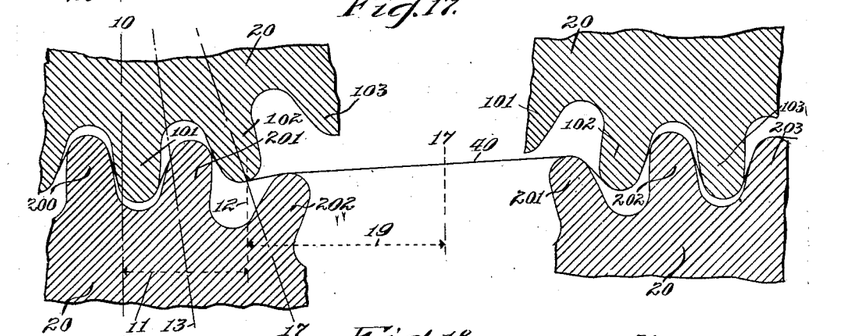
Figure 18:
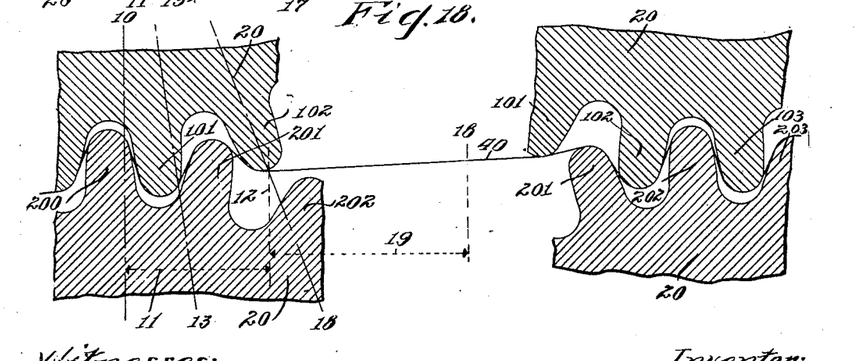

By reference to the enlarged view, Fig. 12, which is of a diagrammatic character, several spaces or zones are illustrated. In the zone or working position 70 between the dotted lines 71 and 72 occurs the principal part of the drawing of the tensioned fibers forcibly along over the edges of the teeth, as more fully represented for instance, in the enlarged view 6 to 9, inclusive. At the time this drawing action is being applied in the said working zone as the fiber passes out of one pair of rolls on its way to the next succeeding pair of rolls, the tautness or proper stress of the fiber being maintained in the meantime, there is also a smaller amount of drawing action over the preceding tooth-edges while these are passing from the zone 75, as indicated at the left of the zone 70. As to the action upon the fiber at this working position it will be observed that the fibers or strands are forcibly drawn forward over the edges 76 and 77 of the teeth 202 and 103 and the seeds are forced between the tooth edges, as indicated, for instance, at 78, and while this motion at the particular moment referred to is comparatively small as compared with the corresponding sliding motion of the fiber over the tooth-edges which at that time happen to come within the working zone, the said motion is nevertheless relatively positive and forcible and the fiber strands are bent sharply over the tooth-edges and are drawn between the narrow space, as, for instance, at 79, with the result of grasping the seed or seeds which may be attached to the fiber and thus causing the fiber strands to pull away from the seed which is thus engaged with the result of quickly clearing the fiber from the seeds, and of doing this in such a manner as not to crush the seed, since at that point referred to while the seeds are being torn away from the fiber the opposing surfaces by which the seeds are then engaged are in the act of separating away from each other instead of being in the act of approaching each other; this latter movement would, of course, tend to crush the seed. The faces 80 and 81 on opposite sides of such space 79 are slowly moving away from each other, and although such space 79 is maintained narrow for an appreciable time yet such gradual enlargement prevents the jamming of the seeds.

Owing to the continued stress or tension on the fiber by reason of the meshing of the flutings of the successive pairs of rolls with each other there results in a drawing-in movement of the fiber between the approaching teeth of the roll on the side where the fiber enters the same, as seen, for instance, at the left-hand in Figs. 6, 7, 8, 9 and 10. The tension also tends in a measure to draw the fiber forward through the whole area of its engagement between the two rollers of a pair of rollers, and this stress or tension while it may not cause a positive movement of the fiber forwardly through the rolls operates to prevent or materially retard any tendency of the fiber to lag behind the rolls in their forward movement. In this way the fiber is brought into the rolls and is bent forwardly and backwardly between the teeth thereof in an equable and normal manner, and on passing out of such engagement is forcibly yet tightly drawn forward over the rounded edges of the teeth, thereby being subjected to the peculiar treatment already described of a drawing movement under tension over the reversely disposed tooth-edges and through the oppositely-disposed curves and angles, all of which tends to break up and separate the woody portions of the plant from the fibrous portions thereof in a rapid and highly effective manner.

As was above stated the tension upon the run of flax or fiber intervening between each of the adjacent pairs of rolls is produced by having the intake or takeup on the rearward or receiving side of one pair of rolls correspond with the output or let-off from the forward side of the next preceding pair of rolls, the separating or receding flutes of one pair of rolls corresponding with the approaching or entering of the flutes of the next succeeding pair of rolls. This will be produced by suitable driving mechanism connected to the rolls and adapted for rotating the several pairs of rolls and maintaining the said coöperative relations of the separating flutes at the point of output at one pair of rolls with the engaging flutes at the point of intake at the next succeeding pair of rolls. This may be accomplished by having suitable connecting mechanism, which in the present instance is shown as a train of gears. The gears 300 which are carried by the shafts 301 of the lower rolls will be in mesh with gears 302 in the nature of idlers, one of the gears 301 will be in mesh with the driving gear 303 fast upon the shaft 304 which is driven by a pulley from some suitable belt not shown. The gearing here shown is merely illustrative.

In carrying on these operations in a series of rolls organized and coacting as herein set forth, the successive pairs of rolls being sufficient in number to accomplish the required amount of treatment due to the size and character of the fiber plants to be treated, the pressure of the first pair or pairs of rolls of the entire set may be so light as to only partially "break" the stalks and branches of the plant, and thereby avoid any substantial amount of seed crushing during the early stages of the process of decortication. When this process has been further advanced and the fiber strands have become considerably separated from the woody portion of the plants the corresponding moderate pressure of the rolls against or toward each other in each pair of rolls is sufficient to continue the decorticating process and to complete the work of separating the seeds from the plant, the seeds so separated being normally shaken out of the fiber by its passage from one pair of rolls to the next succeeding pair of rolls at the succeeding intervals throughout the series of pairs of rolls. After the process has been carried on to a point where the seeds have substantially all been separated from the plant the roll pressure may then be increased in the succeeding pairs of rolls so as to more fully crush any hard portions of woody material, such, for instance, as certain "joints" occurring in the branches of the plant, so that when the fiber emerges from the machine it will be practically free of seeds and also free of crushed portions of the woody part of the plant. This mode of treating the plant as it passes through the series of rolls also operates during the later stages of the process to very fully divide and separate the fiber strands, and thus largely reduce the amount of treatment required by hatcheling or scutching or other supplemental process or treatment.

By means of my present improvement, as will now be clear, the fiber strands of the plants are subjected to repeated treatment and are passed along successively through several pairs of rolls, while the said strands are maintained in a relatively taut condition, whereby the "draw bend" treatment of the fiber strands by the teeth of the rolls is maintained in addition to the crushing action of the rolls both at the point where the strands enter between the rolls and where they pass out from between the same. In this connection it should be noted, as already stated, a slackness of the fiber strands in the space between two succeeding pairs of rolls would operate to release the tension of the fibers against the advancing tooth-edges and thereby prevent said tooth-edges from effecting the proper "draw bend" of the fibers, and also reduce the tension-draft at the point where the seed should be pulled off from the fibers, as, for instance, in the working zone, indicated at 70, Fig. 12.

The relationship existing throughout the series of pairs of rolls will be such that the constancy of tension maintained upon the run of flax between any two pairs of rolls will influence the tension upon the run of flax between every other two pairs of rolls in the series. For instance assuming that there are four pairs of rolls and that the first and second pair maintain the tension on the runs between them constant, and that the third and fourth pair maintain the tension on the run between themselves constant but that the tension maintained upon the run between the second and third pairs is not constant, or is not uniform with the tension on the other runs, such lack of constancy or uniformity of tension will be felt in both directions, namely; at the run between the first and second pairs and at the run between the third and fourth pair, there being a tendency to neutralize the tension so that the erratic tension of the second run will be absorbed as it were by the first and third runs. If the relative timing of the meshing is faulty and produces unevenness of tension at one run the benefits arising from the attunement of meshing of the other pairs of rolls will be largely minimized. Assuming that the series embodied twenty pairs of intermeshing rolls and that four pairs, scattered throughout the series, were improperly timed as to their meshing the beneficial results sought in this system would be largely done away with, owing to the tendency of any length of material when under tension to give up some of its tenseness to a less-tense portion.

Figs. 13 to 18 inclusive represent a series of positions occupied by one of the teeth at the region of the point of contact of the pitch circles of a pair of rolls during the angular advance of one pitch distance. Six different positions are illustrated in this series and the seventh position would be substantially the same as that shown in the first position with, however, the teeth all advanced one pitch distance. In all the views of this series the meridian line 10 remains in the same position and in Fig. 13 there are shown seven radius lines, commencing with the center or radius line of the tooth in question, which bears the reference character 102, showing the various positions the radius line of such tooth will occupy through the various views of such series. Said lines bear for convenience the numbers 13 to 18 inclusive and the seventh or final position bears the reference character 130, this would be the position the radius line would occupy in a repetition of Fig. 13 and assuming the tooth to have advanced a complete pitch distance. In the other views the radius line 13 is illustrated and the radius line pertaining to that particular position of the tooth is also illustrated. This series of views is for the purpose of illustrating the manner in which the run of flax 40 between two pairs of rolls is maintained with a constant tension but is not paid or let-off from the left-hand pair of rolls at a constant speed; the scale upon such run of flax in Fig. 13 bearing the numbers 13 to 18 inclusive shows the distance the run of flax will travel during the travel of the rolls between the radius lines bearing similar numbers, and in each of the succeeding figures the line bearing the number corresponding to such figure indicates the distance the flax has traveled from the line 12, which is a vertical line drawn from the point where the radius line of the tooth passes through the summit of such tooth. And the distance line between the lines 12 and the line in the scale has the reference character 19. The line 11 shows the distance between the meridian line 10 and the line 12 so that by a comparison of the lines 11 and the lines 19 in the various views the fluctuation between the advance of the teeth and the advance of the flax will be apparent. It will also be observed in these views how the run of flax 40 oscillates as it were upon the center between the points of contact of the pitch circles in the two pairs of rolls. When we are considering, for instance, one of the teeth in the upper roll certain phenomena take place during the angular advance of half a pitch distance, whereupon one of the teeth of the lower roll will assume the position of the tooth of the upper when the observation was commenced and there will be a repetition of the same phenomena during the angular advance of the remaining half of the pitch distance.

The above observations relating to the manner in which one pair or set of rolls delivers the run of flax is made use of in attuning the set or timing of the meshing of the teeth or flutings of the next successive pair of rolls so that their intake will be at all times in conformity with the let-off which we have just been considering. The fluctuation from the let-off of one pair of rolls will be equaled by the fluctuations in the intake of the next succeeding pair of rolls thus maintaining at all times a constant uniform tension upon the flax, so that as it is drawn through the bends as illustrated in Figs. 6 to 9 inclusive the shive will be removed from the fibrous portion and there will be no periods of slackness of the flax; were there such periods of slackness the bend of the flax would be impotent, because there would be no drawing through the bend and consequently at every such period of slackness there would be a cessation of the removal of the shive from the fibers, necessitating prolonged or further treatment of the fibers, and waste of certain of the energy of the machine, which could be utilized were the sets of the rolls of the series in proper attunement. The rolls illustrated in these figures are assumed to be moving at uniform speed, and the position shown in each of these views is assumed to indicate an equal angular advance of that pair of rolls; but by reason of the uneven taking up and paying off from a pair of constantly rotated fluted rolls of the matter which is passing between them the advance of such matter, in the present instance assumed to be flax, is variable, and the various pairs of rolls throughout the apparatus will be so adjusted that the capacity for receiving by one pair of rolls will be equal to the delivery capacity of the preceding pair. The capacity for one pair to receive the pay-off or delivery from the preceding pair will maintain the flax in the run constant.

If the operation of the machine be considered in the light of an art or process it may be stated that the flax will be bent, and while so bent will be drawn; the flax will then be straightened out and again bent, and while so bent the second time will be drawn again. Bending and drawing at each of two points is continuous and as the flax advances such two points on the flax being treated will also advance. The length of flax between the two regions of bending is maintained at a constant tension, which constant tension is produced by the second bending of the flax being always equal to the releasing or straightening out of the flax at the preceding bend, the bend always being equal to the straightening which preceded it.

Having described my invention, I claim:

In a device for treating fibrous plants, the herein described combination consisting of a series of pairs of intermeshing fluted rolls located for passing the fiber from one pair to the next succeeding pair and having the rolls of the successive pairs so set in the described rotative positions respectively namely each successive pair at approximately one-third of a pitch distance in phase behind the preceding pair for causing the intake on the rearward side of one pair of rolls to correspond with the output of the forward side of the next preceding pair of rolls and thereby maintain the intervening run of fiber in a condition of normal stress for producing the draw-bend of the fiber over the edges of the separating flutes of one pair of rolls while correspondingly producing a similar action where the fiber enters the approaching flutes of the next succeeding pair of rolls, and driving mechanism connected and adapted for rotating the pairs of rolls while maintaining the said relative set of the rolls.

Signed at the Fuller Building, Broadway and 23d st., New York city, this 16th day of May, 1905.

GEORGES R. DE MONTLORD.

Witnesses:
CHAS. LYON RUSSELL,
ALEX. J. SIMPSON.